(12) United States Patent
Fukuma et al.

(10) Patent No.: US 7,144,650 B2
(45) Date of Patent: Dec. 5, 2006

(54) CHECK VALVE AND FUEL CELL SYSTEM USING THE SAME

(75) Inventors: Kazunori Fukuma, Kawachi-gun (JP); Kouji Miyano, Utsunomiya (JP); Katsumi Sahoda, Tsurugashima (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 478 days.

(21) Appl. No.: 10/338,608

(22) Filed: Jan. 8, 2003

(65) Prior Publication Data

US 2003/0129472 A1  Jul. 10, 2003

(30) Foreign Application Priority Data

Jan. 9, 2002 (JP) ............... 2002-002620

(51) Int. Cl.
*H01M 2/00* (2006.01)
*H01M 2/02* (2006.01)
*F16K 15/16* (2006.01)

(52) U.S. Cl. ............... 429/34; 429/35; 137/855
(58) Field of Classification Search .............. None
See application file for complete search history.

(56) References Cited

U.S. PATENT DOCUMENTS 3,615,842 A * 10/1971 Craft et al. ............... 429/17
6,280,867 B1 * 8/2001 Elias ........................ 429/34

FOREIGN PATENT DOCUMENTS

| JP | 7-272738 | * 10/1995 |
| JP | 2002-313389 | * 4/2001 |

* cited by examiner

*Primary Examiner*—Patrick Joseph Ryan
*Assistant Examiner*—Julian Mercado
(74) *Attorney, Agent, or Firm*—Lahive & Cockfield LLP; Anthony A. Laurentano, Esq.

(57) ABSTRACT

A check valve is disposed in a hydrogen offgas circulation path which is connected to a fuel cell so as to flow the hydrogen offgas only in one direction. Inside a valve housing, a first compression chamber and a second compression chamber are provided such that a bulkhead is disposed therebetween. In the bulkhead 14, a first communication hole 18 and a second communication hole 19 are formed so as to communicate between the first compression chamber and the second compression chamber. In a first reed valve, an opening end is disposed upward and a fixed end is disposed downward. In a second reed valve, an opening end is disposed downward and a fixed end is disposed upward. By doing this, operability in the check valve after water has frozen can be improved.

10 Claims, 5 Drawing Sheets

CHECK VALVE AND FUEL CELL SYSTEM USING THE SAME

BACKGROUND OF THE INVENTION

1. Field of the Invention

The present invention relates to a check valve for allowing a liquid to flow only in one direction. The present invention particularly relates to a check valve for allowing a liquid which is used in a fuel cell to flow only in one direction.

2. Description of Related Art

In a fuel cell which is used in a fuel cell vehicle or the like, an anode is provided on one side of a solid polymer electrolyte membrane and a cathode is provided on the other side of the solid polymer electrolyte membrane, a fuel gas such as a hydrogen gas is supplied to the anode, and an oxidizer gas such as an oxygen or air is supplied to the cathode; thus, a chemical energy which is generated in the oxidation and reduction reaction by these gases is extracted an electric energy directly. In such a fuel cell, a hydrogen gas is ionized in the anode so as to be transferred through the solid polymer electrolyte, and electrons are transferred to the cathode via external load; thus, it is possible to extract electric energy due to an electrochemical reaction in which hydrogen gas and oxygen react to generate water continuously.

Also, in general, in a fuel cell system using such a fuel cell, non-reacted fuel gas is included in a fuel offgas which is exhausted from the fuel cell after the fuel gas is used for generating electricity. Therefore, for the purpose for improving fuel efficiency, the fuel offgas is collected so as to be introduced to a fuel gas supplying path via a fuel offgas circulation path. Thus, the fuel offgas is mixed with fresh fuel gas so as to be supplied to the fuel cell again.

Furthermore, in such a fuel cell system, there are cases in which a highly humid fuel gas remaining in the fuel cell and the fuel gas flow path is scavenged by flowing a low humidity fuel gas by the same path as the case in which the system is operated which does not pass through the fuel cell when an operation of the system is stopped so as to obtain a low humidity atmosphere in the fuel cell and the fuel gas flow path. In such a fuel cell system, check valves are disposed in the fuel offgas circulation path such that a short path such as reverse flow of the low humidity fuel gas in the fuel offgas circulation path does not occur.

Check valves are used not only for such a case but also for any cases in which a flow of a liquid which is used for the fuel cell must be regulated in one direction in the fuel cell system. For such check valves, a reed valve is commonly used because of its simple structure for handling and its cost advantages.

When the reed valve is used in the fuel cell system, the the reed valve must be operable even in the case in which water remaining in the flow path freezes when the fuel cell system is exposed to a below-freezing-point atmosphere. That is, when the reed valve becomes less operable because the water is frozen to stick to movable members, the supply of the fuel gas to the fuel cell is delayed, and smooth startup of the fuel cell is hindered.

In order to avoid such situations, conventionally, contacting surfaces between the reed valve and a valve seat are coated by a an inert member such as tetrafluoroethylene so that the frozen water in unlikely to adhere thereat. In another approach, the reed valves are disposed vertically so that the water which adheres to the reed valve may fall easily.

However, by such conventional approaches to deal with a frozen water in the reed valve, it was not possible to avoid the case in which a little amounts of frozen water remaining in the reed valve are frozen. Therefore, there was a problem in that such a small amount of frozen water increased the load for opening the valve; thus, the operability of the reed valve was deteriorated. Also, in a reed valve which is provided with a stopper for limiting an opening stroke of the valve, it was possible to open the valve even if the water was frozen. However, the opening stroke of the reed valve became narrow due to icy pieces which were generated between the reed valve and the stopper; thus, there was a problem in that the liquid flow was reduced in comparison with the case in which the water is not frozen.

SUMMARY OF THE INVENTION

The present invention was made in consideration of the above problems. An object of the present invention is to provide a check valve and a fuel cell system having the same in which opening load can be decreased in the case in which water is frozen therein and limitation for the opening stroke in the valve is less even if the water is frozen so as to realize smooth operability under conditions in which water is frozen.

In order to solve the above problems, in a first aspect of the present invention; a check valve has a first reed valve and a second reed valve wherein the first reed valve and the second reed valve are disposed in a flow path which leads to a fuel cell, the first reed valve and the second reed valve are disposed in series for a flow of a liquid which is used for the fuel cell, flow directions in the first reed valve and the second reed valve are the same, an opening end for the first reed valve is disposed upward, and a fixed end for the first reed valve is disposed downward, in the second reed valve, an opening end for the second reed valve is disposed downward, and a fixed end for the second reed valve is disposed upward.

In this aspect of the present invention, the first reed valve is disposed such that its opening end is upward. By doing this, even if water condensation droplets adhere to the opening end, these water condensation droplets fall by gravity. Therefore, there are few water condensation droplets remaining at the opening end; thus, the amount of frozen water is highly reduced. Therefore, it is possible to reduce the load for opening the first reed valve after the water is frozen. In the first reed valve, the water water condensation droplets remain collectively at the fixed end which is disposed downward. As a result, although, pieces of ice tend to be generated; thus the stroke for opening the valve is limited relatively greatly due to the frozen water, this is not a serious problem in the case in which a small amount of liquid flows thereat.

On the other hand, in the opening end of the second reed valve which is disposed downward, water condensation droplets tend to remain at the opening end in comparison with the case of the first reed valve. Therefore, more pieces of ice tend to be generated than in the case of the first reed valve. As a result, the load for opening the second reed valve under conditions in which the water is frozen is greater than the load for opening the first reed valve. However, water condensation droplets hardly remain in the fixed end of the second reed valve which is disposed upward. Therefore, the stroke for opening the second reed valve under conditions in which that the water is frozen is less greatly limited than in the case of the first reed valve.

Accordingly, in such a check valve, the first valve opens by a small load for opening it under conditions in which the water is frozen. As the amount of the liquid which flows in the first reed valve increases, pressure which acts on the second reed valve increases gradually. When such pressure reaches a load for opening the second reed valve, the second reed valve opens. The stroke for opening the second reed valve is less limited under conditions in which the water is frozen; thus, it is possible to flow a large amount of liquid at once after the second reed valve opens.

A second aspect of the present invention is a check valve which is disposed on a flow path which leads to a fuel cell so as to flow a liquid which is used for the fuel cell in one direction wherein a first compression chamber and a second compression chamber are provided in a valve housing so as to be on both sides of a bulkhead, a first communication hole and a second communication hole are formed on the bulkhead so as to communicate between the first compression chamber and the second compression chamber, the first reed valve for opening and closing the first communication hole is disposed at either one of the first compression chamber or the second compression chamber on the bulkhead such that the opening end is disposed upward and the fixed end is disposed downward, the second reed valve for opening and closing the second communication hole is disposed such that the opening end is disposed downward and the fixed end is disposed upward.

In this aspect of the present invention, both the first reed valve and the second reed valve are provided in either the first compression chamber or the second compression chamber on the bulkhead. Thus, it is possible to flow a liquid only in one direction in both of the reed valves.

Also, the first reed valve is disposed such that its opening end is upward. By doing this, even if a water condensation droplets adhere to the opening end, the water condensation droplets fall by gravity. Therefore, there are few water condensation droplets remaining at the opening end; thus, the amount of frozen water is greatly reduced. Therefore, it is possible to reduce the load for opening the first reed valve after the water is frozen. In the first reed valve, the water condensation droplets remain at the fixed end which is disposed downward. As a result, although pieces of ice tend to be generated, the stroke for opening the valve is limited relatively greatly due to the frozen water, this is not a serious problem in the case in which a small amount of liquid flows thereat.

On the other hand, at the opening end of the second reed valve which is disposed downward, water condensation droplets tend to collect and remain at the opening end in comparison with the case of the first reed valve. Therefore, more pieces of ice tend to be generated than in the case of the first reed valve. As a result, the load for opening the second reed valve under conditions in which the water is frozen is greater than the load for opening the first reed valve. However, water condensation droplets hardly remain in the fixed end of the second reed valve which is disposed upward. Therefore, the stroke for opening the second reed valve under conditions in which the water is frozen is less greatly limited than in the case of the first reed valve.

Accordingly, in such a check valve, the first valve opens by a small load for opening it under conditions in which the water is frozen. As the amount of the liquid which flows in the first reed valve increases, pressure which acts on the second reed valve increases gradually. When such pressure reaches a load for opening the second reed valve, the second reed valve opens. The stroke for opening the second reed valve is less limited under conditions in which the water is frozen; thus, it is possible to flow a large amount of liquid.

A third aspect of the present invention is a fuel cell system which comprises a fuel cell for generating electricity using a fuel gas and an oxidizer gas, a fuel flow path which is used for least one of supplying the fuel to the fuel cell, and exhausting the fuel which is sent from the fuel cell, and the check valve according to the first or the second aspect is disposed in the fuel flow path.

By doing this, it is possible to open the fuel flow path quickly when operation for the fuel cell is started again after the check valve is frozen. Also, it is possible to increase the flow amount of the liquid which flows in the fuel flow path quickly.

A fourth aspect of the present invention is a fuel cell system which is provided with a check valve in a fuel flow path wherein a liquid flows in the fuel flow path under conditions in which water which adheres to the check valve is frozen, a first reed valve which has a fixed end which is disposed downward on the check valve is released at first, and a second reed valve which has a fixed end which is disposed upward on the check valve is released by pressure due to an increase in the liquid flow.

In the first reed valve, the fixed end is disposed downward and the opening end is disposed upward; therefore, the load for opening the first reed valve can be small. Thus, when a liquid flows in the fuel flow path under conditions in which the water which sticks to the check valve is frozen, the first reed valve opens at first.

On the other hand, in the second reed valve, the fixed end is disposed upward and the opening end is disposed downward; therefore, the load for opening the second reed valve is large. Thus, when a liquid flows in the fuel flow path under conditions in which the water which adheres the check valve is frozen, the first reed valve opens at first. Although the second reed valve does not open when the first reed valves begins opening, the second reed valve opens under conditions in which the first reed valve opens so as to flow the liquid, the pressure which acts to the second reed valve increases according to the increase in the flow amount of the liquid, and finally the pressure reaches the load for opening the second reed valve. That is, the second reed valve is released by the pressure which increases according to the increase of the flow amount of the liquid after the first reed valve opens.

By doing this, when the liquid flow in the fuel flow path under conditions in which the water which adheres to the check valve is frozen, it is possible to open the fuel flow path quickly. Also, it is possible to quickly increase the flow amount of the liquid which flows in the fuel flow path.

As explained above, according to the first and the second aspects of the present invention, the first reed valve 21 is opened by a small load at first after the check valve is frozen. A small amount of liquid flows in the first reed valve 21, and as the flow amount increases, forces which act on the second reed valve 22 increase. When the forces reach the load for opening the second reed valve 22, the second reed valve 22 is opened. Thus, it is possible to flow a large amount of liquid; therefore, it is possible to reduce the load for opening the valves after the water is frozen and to relax the limit for stroke for opening the valves which is caused by the frozen water. Therefore, there is a superb effect in that the operability of the fuel cell system can be improved after the check valve is frozen.

According to the third aspect of the present invention, it is possible to open the fuel flow path quickly when the fuel cell system is started after the check valve is frozen. Also, it is possible to increase the flow amount of liquid which flows in the fuel flow path quickly; therefore, there is a superior effect in that the ordinary operating condition for the fuel cell can be established quickly.

According to the fourth aspect of the present invention, it is possible to open the fuel flow path quickly when the liquid flows in the fuel flow path under conditions in which the water adhering to the check valve is frozen. Also, it is possible to rapidly increase the flow amount of liquid which flows in the fuel flow path; therefore, there is a superior effect in that the normal operating condition for the fuel cell can be established quickly.

DETAILED DESCRIPTION OF THE INVENTION

Embodiments of the check valve according to the present invention and the fuel cell system using the same are explained as follows with reference to FIGS. 1 to 6.

Figure 1:
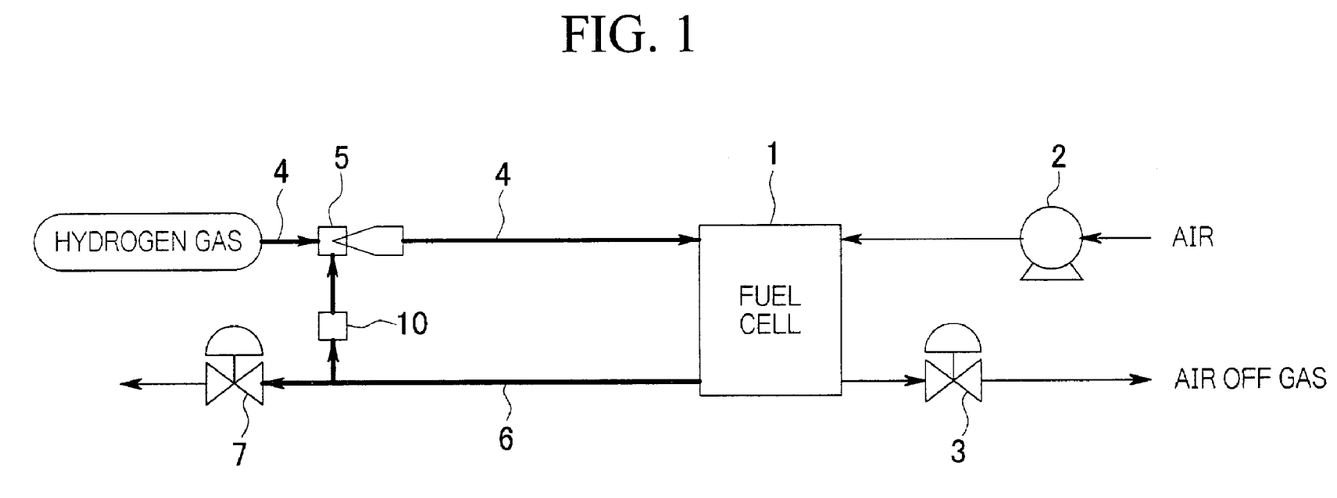
FIG. 1 is a general diagram of a fuel cell system which is used in a fuel cell vehicle.

FIG. 1 is a general diagram of a fuel cell system which is used in a fuel cell vehicle. Reference numeral 1 is a solid polymer electrolyte membrane fuel cell. The solid polymer electrolyte membrane fuel cell 1 is provided with an anode on one side of a solid polymer electrolyte membrane and a cathode on the other side of the solid polymer electrolyte membrane. When a hydrogen gas as a fuel gas is supplied to the anode and air as an oxidizer gas is supplied to the cathode, the hydrogen gas is ionized in the anode so as to be transferred in the solid polymer electrolyte membrane. Electrons are transferred to the cathode via an external load; thus electric energy due to an electrochemical reaction in which hydrogen gas and oxygen react to generate water continuously is possible.

Air as an oxidizer gas is compressed to a predetermined pressure by a compressor 2 so as to be supplied to a cathode in the fuel cell 1. After the air is used for generating electricity, the air is exhausted as an air offgas from the fuel cell 1 via the compression control valve 3. Also, a hydrogen gas as a fuel gas which is supplied from a fuel-supplying device (not shown in the drawing) is supplied to an anode in the fuel cell 1 via a hydrogen gas supplying path 4 and an ejector 5. After the hydrogen gas is used for generating electricity, the hydrogen gas is exhausted from the fuel cell 1 as a hydrogen offgas. Consequently, the hydrogen offgas is absorbed by the ejector 5 via a hydrogen offgas circulation path 6 so as to be mixed with a fresh hydrogen gas which is supplied by the fuel supplying device; thus, the hydrogen gas is supplied to the anode in the fuel cell 1 again.

A check valve 10 is disposed in the hydrogen offgas circulation path 6 so that a reverse-flow of the hydrogen gas which flows in the hydrogen gas supplying path 4 does not occur from the ejector 5 to the hydrogen offgas circulation path 6. Also, in the hydrogen offgas circulation path 6, a purge valve 7 is disposed so as to exhaust a gas which flows in the hydrogen offgas circulation path 6 to the outside of the fuel cell system.

The purge valve 7 is closed during an ordinary operation for generating electricity, and opens according to necessity. The fuel cell 1 produces water during electricity generating operations; thus, the inside of the fuel cell 1 is very humid. When the fuel cell system stops under such conditions, a moisture remaining in the gas flow path in the fuel cell 1 freezes when the atmosphere around the system becomes cold. In such a case, there is a problem in that the flow of reaction gas is hindered when the operation is re-started or efficiency for generating electricity is deteriorated because the solid polymer electrolyte membrane is frozen. In order to avoid such problems, while the fuel cell system is stopped, the purge valve 7 is opened so as to supply the hydrogen gas to the anode in the fuel cell 1; thus, the very humid hydrogen gas remaining in the fuel cell 1 is scavenged from the purge valve 7 via the hydrogen offgas circulation path 6. When the purge valve is open, the check valve 10 prevents the short path from the ejector 5 to the hydrogen offgas circulation path 6 by the hydrogen gas which flows in the hydrogen gas supplying path 4. Here, in the present embodiment, a fuel path comprises the hydrogen gas supplying path 4 and a hydrogen offgas circulation path 6. Also, a check valve 10 is disposed in the fuel path.

Figure 3:
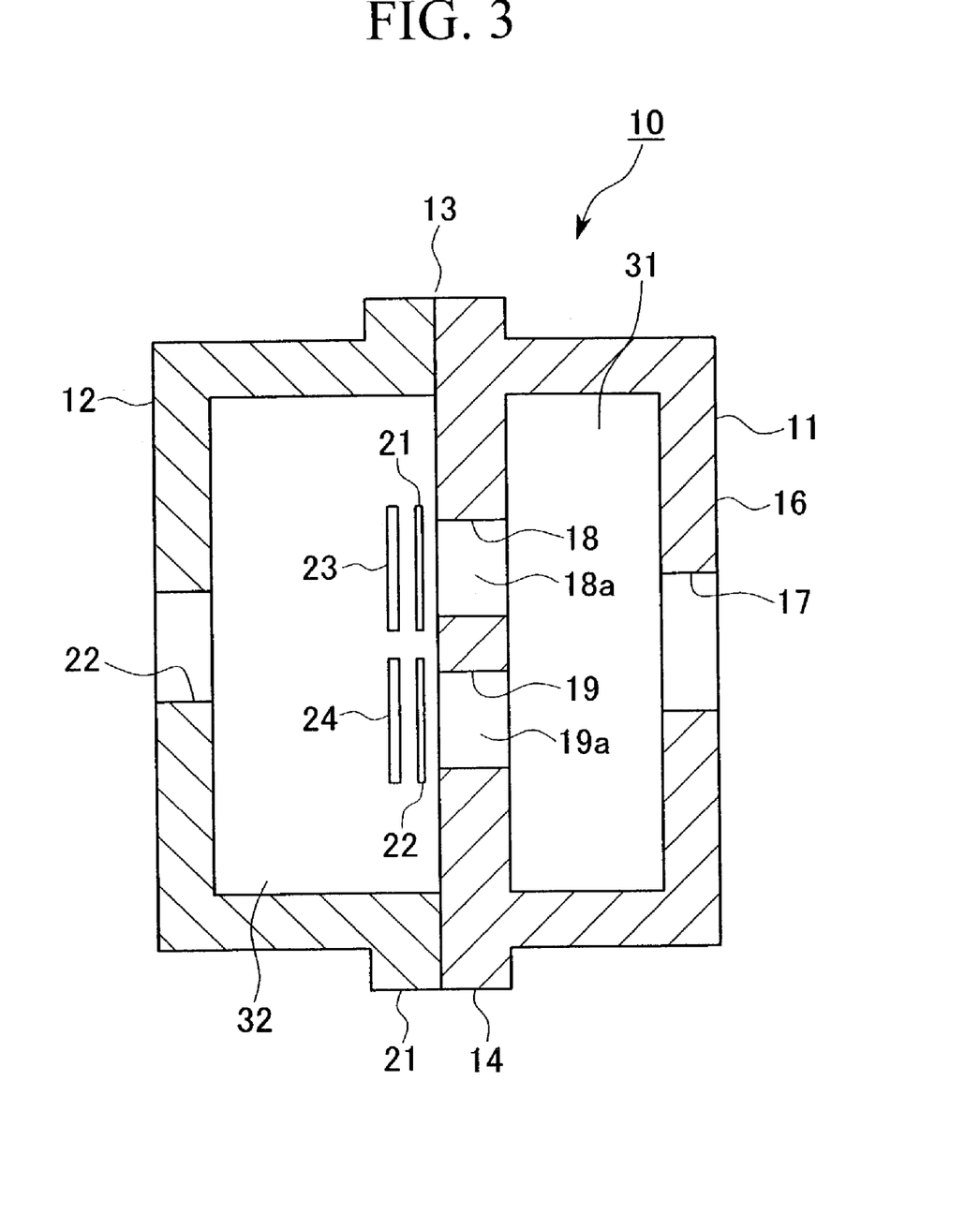
FIG. 3 is a horizontal cross section of the check valve.
Figure 4:
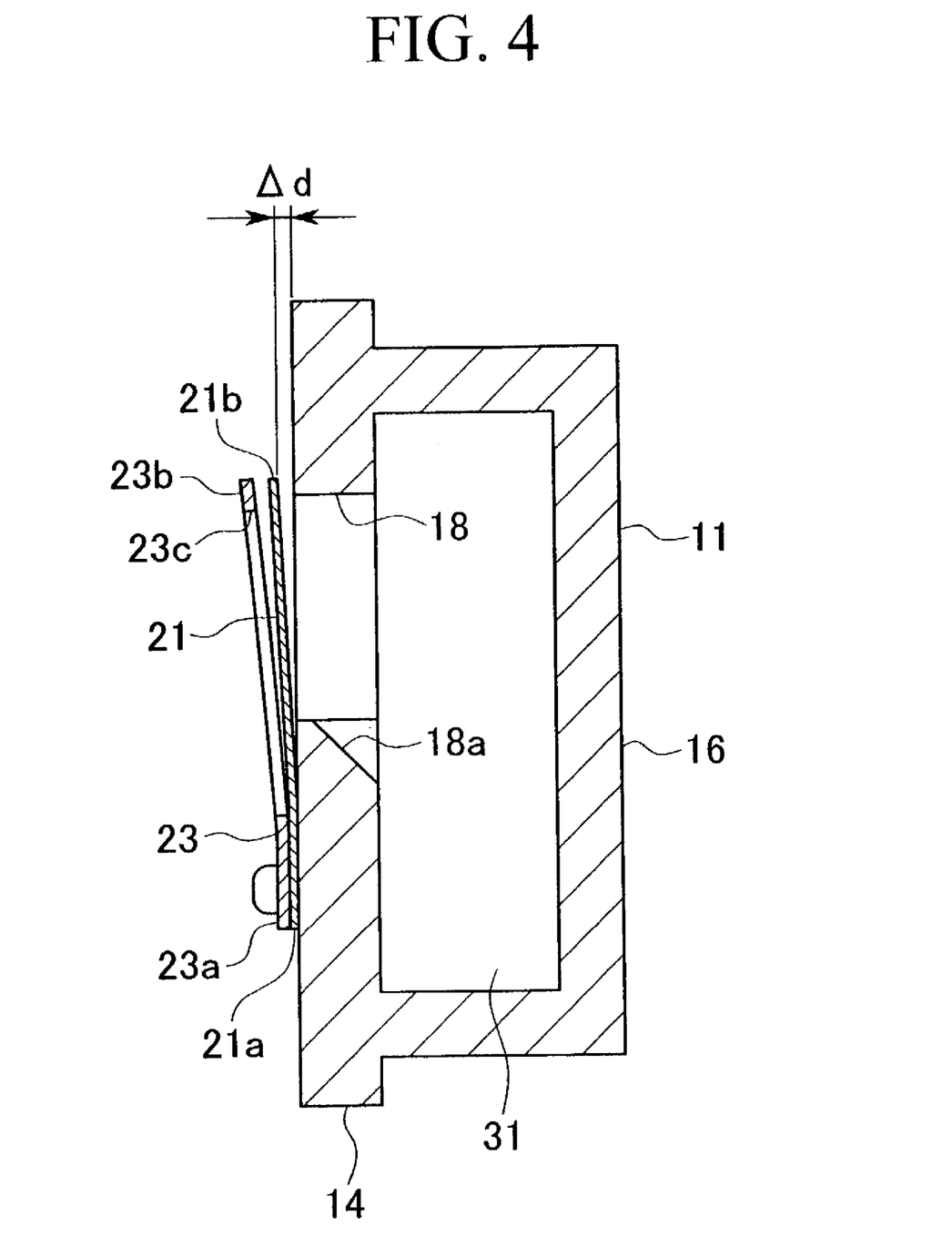
FIG. 4 is a vertical cross section of the first housing in the check valve.

Next, a check valve 10 is explained with reference to FIGS. 2 to 4.

Figure 2:
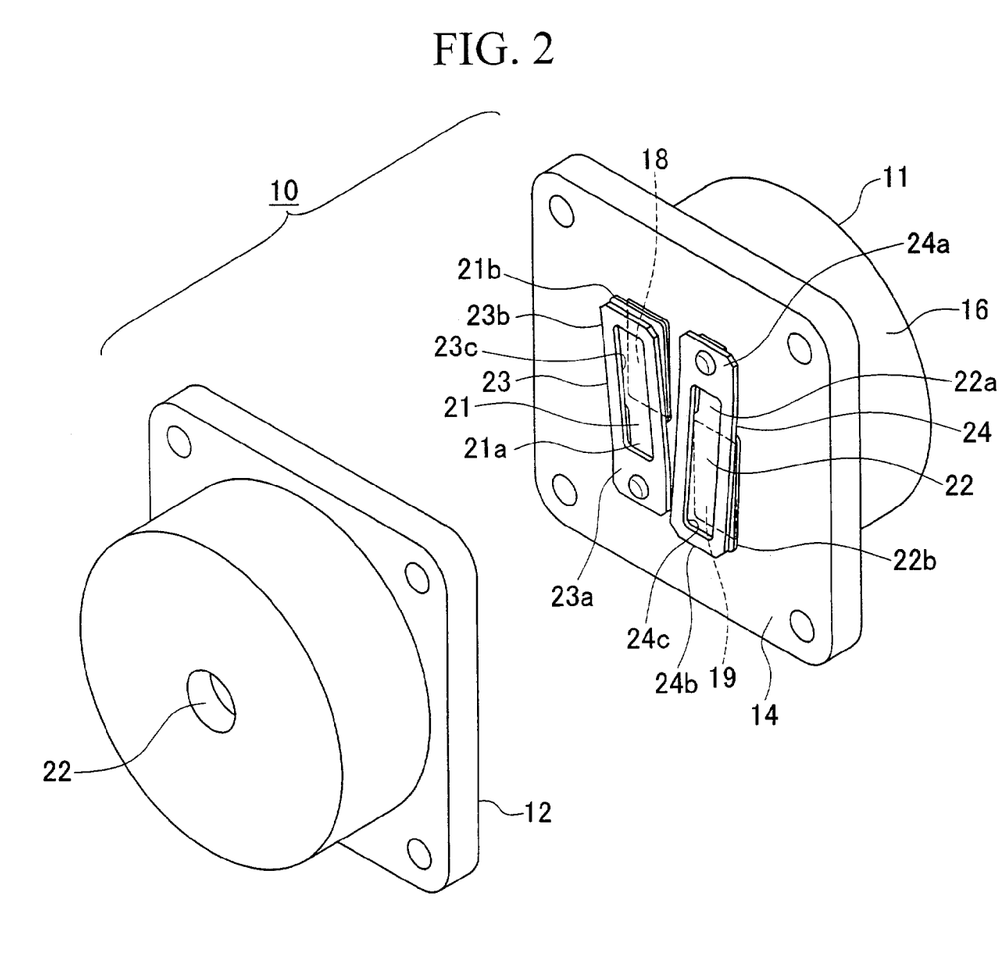
FIG. 2 is a perspective view of the check valve.

FIG. 2 is a perspective view for the check valve 10. FIG. 3 is a horizontal cross section of the check valve 10.

The check valve 10 is provided with a valve housing 13 which is an assembly of a first housing 11 and a second housing 12. The first housing 11 is disposed in a region nearer to an upstream in the hydrogen offgas circulation path 6 (that is, a region near the fuel cell 1 and the purge valve 7). The second housing 12 is disposed in a region nearer to a downstream in the hydrogen offgas circulation path 6 (that is, a region near the ejector 5). FIG. 4 is a vertical cross section of the first housing 11.

The first housing 11 is provided with a plate bulkhead 14 which is disposed on a assembling surface of the first housing 11 to the second housing 12 and a cylindrical section 16 which is expanded from the plate bulkhead 14. Inside of the cylindrical section 16 is a first compression chamber 31. On an end of the cylindrical section 16, a gas inlet hole 17 which communicates with the hydrogen offgas circulation path 6 is made. On a bulkhead 14, a first communication hole 18 and a second communication hole 19 which communicate with the first compression chamber 31 are made in an offset manner vertically and horizontally. Both of the communication holes 18 and 19 are formed as squares having the same shape and the same dimensions as each other. On bottom surfaces of the inside the communication holes 18 and 19, tapered surfaces 18a and 19a, which have downward slope toward the first compression chamber 31, are formed.

A cross section of the second housing 12 is shaped like a hat. Inside of the second housing 12 is a second compression chamber 32. A flange section 21 of the second housing 12 is attached to the marginal section of the bulkhead 14 of the first housing 11; thus, the second housing 12 and the first housing 11 are assembled in one unit. On an end surface of the second housing 12, a gas outlet port 22 is made for communicating to the hydrogen offgas circulation path 6.

On a surface of the bulkhead which is assembled to the second housing 12, a first reed valve 21 for opening and closing the first communication hole 18 and a second reed valve 22 for opening and closing a second communication hole 19 are attached. The opening and closing operation of the reed valves 21 and 22 are performed according to a difference of the pressure in the first compression chamber 31 and the second compression chamber 32.

In the first reed valve 21, the fixed end 21a is disposed downward and the opening end 21b is disposed upward. On a back surface of the first reed valve 21, a stopper 23 for limiting a stroke for opening the first reed valve 21 is disposed. The fixed end 23a in the stopper 23 is disposed downward so as to be fixed on the bulkhead 14 together with the fixed end 21a in the first reed valve 21. A free end 23b in the stopper 23 expands upward in slanted manner toward the second compression chamber 32. On a free end 23b in the stopper 23, a hole 23c which is open only having a marginal end of the free end 23b is formed.

On the other hand, the first reed valve 21 and the second reed valve 22 are disposed so as to be in inverted manner. That is, in the second reed valve 22, the fixed end 22a is disposed upward and the opening end 22b is disposed downward. On a back surface of the second reed valve 22, a stopper 24 for limiting a stroke for opening the second reed valve 22 is disposed. The fixed end 24a in the stopper 24 is disposed upward so as to be fixed on the bulkhead 14 together with the fixed end 22a in the second reed valve 22. A free end 24b in the stopper 24 expands downward in slanted manner toward the second compression chamber 32. On a free end 24b in the stopper 24, a hole 24c which is open only having a marginal end of the free end 23b is formed.

When there is no pressure difference between the first compression chamber 31 and the second compression chamber 32, the first reed valve 21 and the second reed valve 22 are closed. Both reed valves 21 and 22 are disposed in a predetermined position such that a gap $\Delta d$ having a distance such as 0.3 to 0.5 mm is formed between tips of the opening ends 21b and 22b and the bulkhead 14 under such a closed condition. More preferably, the gap should have a distance such as 0.4 mm between tips of the opening ends 21b and 22b and the bulkhead 14. Here, it was experimentally confirmed that the amount of liquid leakage does not differ whether or not there is the gap $\Delta d$.

When gas pressure in the first compression chamber 31 is greater than gas pressure in the second compression chamber 32, a force based on the gas pressure difference acts on the opening end 21b in the first reed valve 21 and the opening end 22b in the second reed valve 22 in a direction in which valves open. Thus, the first reed valve 21 and the second reed valve 22 open according to the extent of the pressure difference. As a result, the gas in the first compression chamber 31 flows to the second compression chamber 32 via the first communication hole 18 and the second communication hole 19.

In contrast, when gas pressure in the second compression chamber 32 is greater than gas pressure in the first compression chamber 31, a force based on the gas pressure difference acts on the opening end 21b in the first reed valve 21 and the opening end 22b in the second reed valve 22 in a direction in which valves close. Thus, the first reed valve 21 and the second reed valve 22 are pushed toward the bulkhead 14 so as to be closed. That is, in the check valve 10 according to the present invention, both the first reed valve 21 and the second reed valve 22 are attached on a surface which faces the second compression chamber 32 in the bulkhead 14; therefore, flow of the hydrogen gas is only in one direction.

Next, operation for the check valve 10 is explained.

Here, explanation is made under conditions in which there is a slight amount of moisture in the check valve 10 when the operation of the fuel cell system is stopped. When the atmosphere around the fuel cell system falls below the freezing point after the fuel cell system stops, the moisture remaining in the check valve 10 condenses on surfaces of the first reed valve 21, the second reed valve 22 and the stoppers 23 and 24; thus, water condensation droplets are produced.

However, the opening end 21 in the first reed valve 21 is disposed upward. Even if a water condensation droplet adheres to the opening end 21b, the water condensation droplets fall due to gravity; therefore, there is almost no water condensation droplets remaining in the opening end 21b. When atmosphere falls below the freezing point in which the water condensation droplets are frozen, the amount of frozen moisture in the opening end 21b in the first reed valve 21 is quite small. As a result, a load for opening the first reed valve 21 after the water is frozen is quite low.

Here, in the first reed valve 21, water condensation droplets tend to remain in the fixed end 21a which is disposed downward. However, the water condensation droplets which fall between the first reed valve 21 and the stopper 23 further drop through the hole 23c which is formed on the stopper 23. Also, a bottom surface inside the first communication hole 18 is formed as a tapered surface 18a; thus, the water condensation droplets hardly stick to the bottom surface inside the first communication hole 18. By doing this, there is a very small amount of water condensation droplets remaining in the fixed end 21a in the first reed valve 21; thus, generation of frozen moisture in the opening end 21a can be reduced greatly. As a result, a limit for a stroke for opening the first reed valve 21 which is caused by frozen moisture can be reduced greatly when the fuel cell system is restarted after water has frozen.

On the other hand, the opening end 22b in the second reed valve 22 is disposed downward; therefore, the water condensation droplets tend to remain in the opening end 22b in comparison to the case of the first reed valve 21. Thus, the generation of the frozen moisture in the opening end 22b is greater than in the case of the first reed valve 21. Therefore, load for opening the second reed valve 22 is greater than the load for opening the first reed valve 21 when the water is frozen. However, the water condensation droplets hardly remain in the fixed end 22a which is disposed upward in the second reed valve 22; thus, a limit for a stroke for opening the second reed valve 22 can be smaller than in the case of the first reed valve 21 which is caused by frozen moisture can be reduced greatly.

Accordingly, hydrogen gas is supplied to the fuel cell 1 via the hydrogen gas supply path 4 under conditions in which the water that adheres to the check valve 10 is frozen, and the hydrogen offgas which is exhausted from the fuel cell 1 is supplied to the check valve 10 via the hydrogen offgas circulation path 6. Under such conditions, in the check valve 10, the first reed valve 21 opens with a small load at first. As the flow amount of the liquid (that is, hydrogen offgas) in the first reed valve 21 increases, the pressure which acts on the second reed valve 22 increases gradually. When the pressure reaches the load for opening the second reed valve 22, the second reed valve 22 opens accordingly. In addition, limit for a stroke for opening the second reed valve 22 caused by the frozen moisture is quite small; therefore, it is possible to widely open the second reed valve 22 at once after the valve opens. Therefore, it is possible to flow a large amount of hydrogen offgas by opening the second reed valve 22.

Figure 5:
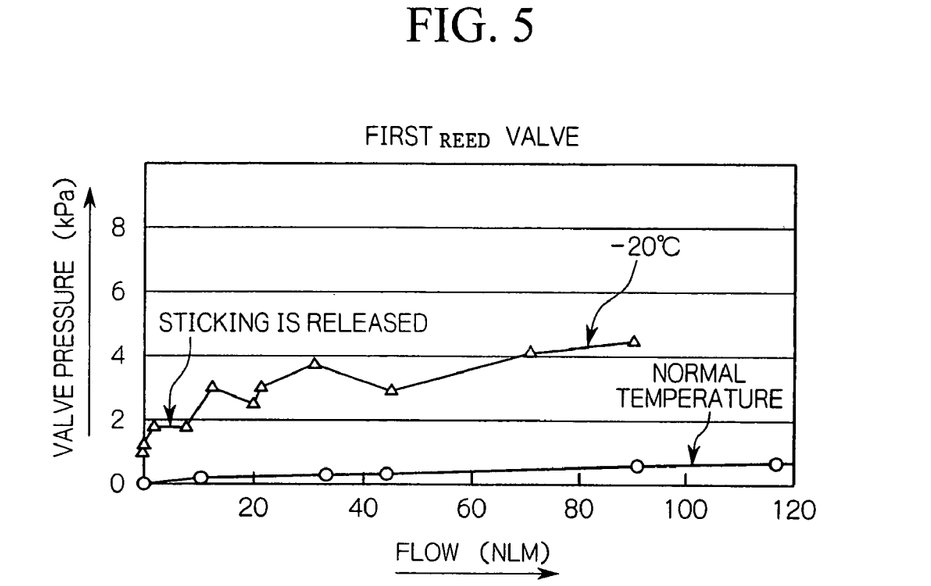
FIG. 5 is a graph showing characteristics of valve-supply-pressure according to the flow amount of the gas in the first reed valve.

FIG. 5 is a graph showing characteristics of valve-supply-pressure according to the flow amount of the gas in the first reed valve 21. In this graph, the relationship between the pressure which is applied to the first reed valve 21 (hereinafter called valve-supply-pressure) and the flow amount of the gas for two cases such as at ordinary temperature and minus 20° C. is shown. According to this graph, when the valve-supply-pressure in the first reed valve 21 reaches to 2 kPa under conditions in which the water is frozen, the frozen water which adheres to the first reed valve 21 is removed so as to start the opening of the valve.

Figure 6:
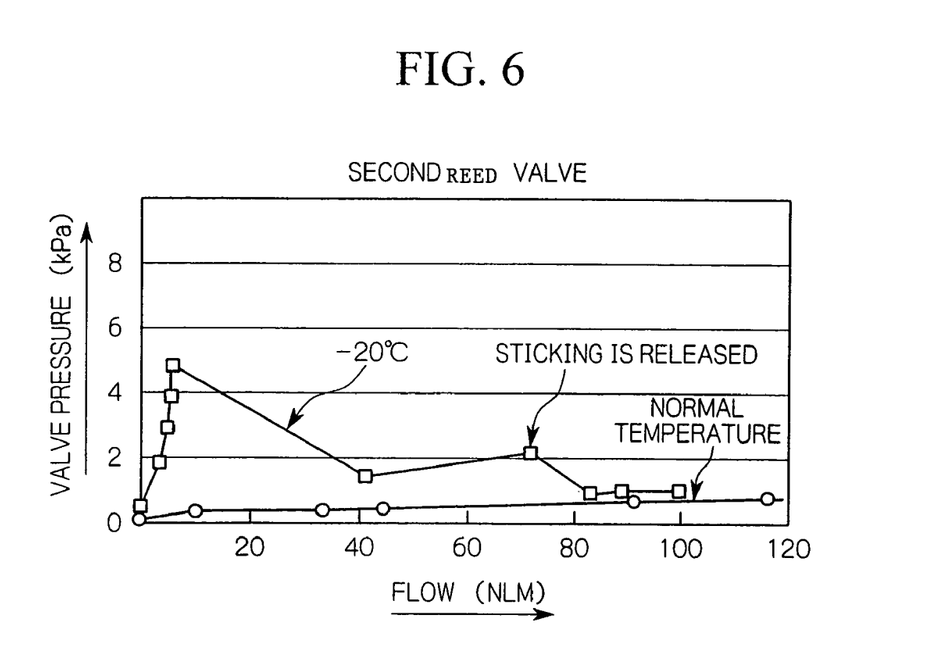
FIG. 6 is a graph showing characteristics of valve-supply-pressure according to the flow amount of the gas in the second reed valve.

FIG. 6 is a graph showing characteristics of valve-supply-pressure according to the flow amount of the gas in the second reed valve 22. In this graph, the relationship between the pressure which is applied to the second reed valve 22 and the flow amount of the gas for two cases such as an ordinary temperature and minus 20° C. is shown. According to this graph, the valve-supply-pressure in the second reed valve 22 keeps rising until the frozen water which adheres to the first reed valve 21 is removed when the water is frozen. Once the frozen water which sticks to the first reed valve 21 is removed, the supply pressure in the second reed valve 22 decreases. After that, the valve-supply-pressure of the second reed valve 22 rises again according to the increase in the flow of the gas. When the valve-supply-pressure in the second reed valve 22 reaches approximately 2 kPa, the frozen water which adheres to the second reed valve 22 is removed; thus the second reed valve 22 opens. After the second reed valve 22 opens, characteristics in the flow amount become the same as these at the ordinary temperature.

The valve-supply-pressure in the second reed valve 22 is lower than the valve-supply-pressure in the first reed valve 21 before the water which adheres to the second reed valve 22 is removed and after the water which adheres to the first reed valve 21 is removed. The reason is believed to be because the second reed valve 22 is disposed in an non-smooth gas flow region.

By doing this, according to the present embodiment of the check valve 10, it is possible to reduce the load for opening valves when the operation of the fuel cell system is restarted after the adhering water is removed. Also, the limit for a stroke of the valve caused by the frozen water can be softened; thus, operability of the check valve 10 after the water is frozen is improved greatly.

Also, when the fuel cell system is started after the check valve 10 is frozen, it is possible to open the hydrogen offgas circulation path 6 quickly. In addition, it is possible to increase the amount of the hydrogen offgas circulation quickly; thus, it is possible to quickly establish an normal operation conditions for generating electricity in the fuel cell 1.

What is claimed is:

1. A check valve comprising a first reed valve and a second reed valve, wherein
    the first reed valve and the second reed valve are disposed on a flow path which leads to a fuel cell,
    the first reed valve and the second reed valve are disposed in parallel for a flow of a liquid which is used for the fuel cell, wherein flow directions in the first reed valve and the second reed valve are the same,
    an opening end for the first reed valve is disposed upward, and a fixed end for the first reed valve is disposed downward, and
    in the second reed valve, an opening end for the second reed valve is disposed downward, and a fixed end for the second reed valve is disposed upward.

2. A fuel cell system, comprising:
    a fuel cell for generating electricity using a fuel gas and an oxidizer gas;
    a fuel flow path which is used for at least one of supplying the fuel to the fuel cell, and exhausting the fuel which is sent from the fuel cell; and
    a check valve according to claim 1 which is disposed in the fuel flow path.

3. A check valve according to claim 1, wherein
    a stopper is disposed on a back surface of the first reed valve so as to limit a stroke for opening the first reed valve, and
    a stopper is disposed on a back surface of the second reed valve so as to limit a stroke for opening the second reed valve.

4. A check valve according to claim 1, wherein both of said first and second reed valves are disposed in a predetermined position so that a gap is formed between tips of the opening ends and the bulkhead under a sealed condition.

5. A check valve according to claim 1, wherein a dimension of a gap between tips of the opening ends and the bulkhead is 0.3 to 0.5 mm between tips of the opening ends and the bulkhead.

6. A check valve which is disposed in a flow path which leads to a fuel cell so as to permit a one-way directional flow of a liquid which is used for the fuel cell, wherein
    a first compression chamber and a second compression chamber are provided in a valve housing so as to be on both sides of a bulkhead,
    a first communication hole and a second communication hole are formed on the bulkhead so as to communicate between the first compression chamber and the second compression chamber,
    a first reed valve for opening and closing the first communication hole is disposed at either one of the first compression chamber and the second compression chamber on the bulkhead so that the an opening end of the first reed valve is disposed upward and a fixed end thereof is disposed downward,
    a second reed valve for opening and closing the second communication hole is disposed so that an opening end of the second reed valve is disposed downward and a fixed end thereof is disposed upward, and
    the first reed valve and the second reed valve are disposed on the same side with respect to the bulkhead.

7. A fuel cell system, comprising:
    a fuel cell for generating electricity using a fuel gas and an oxidizer gas;
    a fuel flow path which is used for at least one of supplying the fuel to the fuel cell, and exhausting the fuel which is sent from the fuel cell; and
    a check valve according to claim 6 which is disposed in the fuel flow path.

8. A check valve according to claim 6, wherein
    a stopper is disposed on a back surface of the first reed valve so as to limit a stroke for opening the first reed valve, and
    a stopper is disposed on a back surface of the second reed valve so as to limit a stroke for opening the second reed valve.

9. A check valve according to claim 6, wherein both of said first and second reed valves are disposed in a predetermined position so that a gap is formed between tips of the opening ends and the bulkhead under a sealed condition.

10. A check valve according to claim 6 wherein a dimension of a gap between tips of the opening ends and the bulkhead is 0.3 to 0.5 mm.

* * * * *